United States Patent [19]

Lee

[11] 4,308,683
[45] Jan. 5, 1982

[54] TRAP ANCHORING STAKE

[76] Inventor: Donald R. Lee, Box 588, Sundance, Wyo. 82729

[21] Appl. No.: 157,005

[22] Filed: Jun. 6, 1980

[51] Int. Cl.³ .............................................. A01M 23/00
[52] U.S. Cl. ..................................... 43/96; 248/156; 52/162
[58] Field of Search ..................... 43/96, 97; 248/156; 52/155, 162, 163

[56] References Cited

U.S. PATENT DOCUMENTS

| | | | |
|---|---|---|---|
| 1,153,450 | 9/1915 | Schaff | 52/155 |
| 1,982,963 | 12/1934 | Post | 52/162 |
| 2,058,751 | 10/1936 | Woolfrey | 43/96 |
| 3,986,366 | 10/1976 | Dinsmore | 52/155 |
| 4,226,042 | 10/1980 | Gilbert | 43/96 |

*Primary Examiner*—Jimmy C. Peters

*Attorney, Agent, or Firm*—Whittemore, Hulbert & Belknap

[57] ABSTRACT

A trap anchoring stake for anchoring an animal trap in soft or loose soils where in the past excessive stake length has been required to keep the trapped animal from pulling out the stake. The stake has a spring arm connected to the bottom of the stake for outward pivoted movement, and adapted to retain the stake in the ground by lateral pressure on surrounding soil, or by lateral penetration of the top end of the spring arm into the soil, or both. A spring arm latch is provided for connection to a trap tether chain operable to automatically release the latch by movement of a trapped animal, in case the trapper forgets to release the spring arm. An abutment limits outward movement of the spring arm to an acute angle to the stake, and the arm and stake constitute obstruction means which will hang up on brush or the like if the trapped animal succeeds in pulling the stake out of the ground.

15 Claims, 7 Drawing Figures

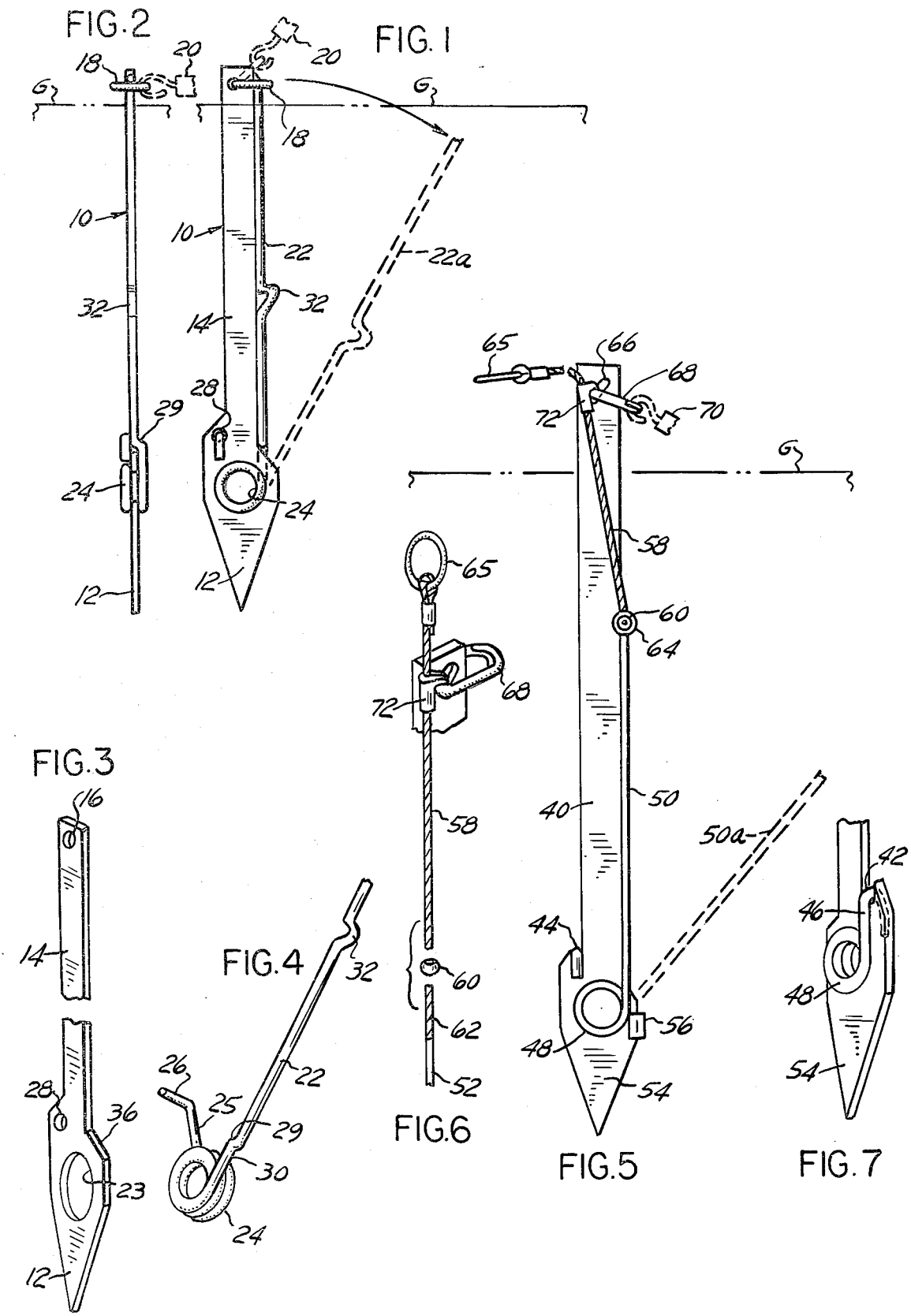

TRAP ANCHORING STAKE

BRIEF SUMMARY OF THE INVENTION

In the past animal traps of the leghold type have been anchored simply by connecting them to a stake driven into the ground. Where loose or soft soil is encountered, stakes up to forty or more inches in length have been used.

The stake of the present invention may be much shorter, as for example, eighteen to twelve inches. This is accomplished by attaching a stiff, rigid spring arm to the entering end of the stake, the arm being resiliently urged laterally to pivot about the entering end of the stake. Preferably, but not strictly necessarily, the free end of the arm may be latched to the upper portion of the stake as the stake is driven.

Conveniently, the spring arm comprises an elongated wire or rod having an integral coil spring at one end for connection to the entering end of the stake.

One type of latch is essentially a loop or ring to which the trap tether chain is engaged so that if the trapper forgets to release the spring arm, this is accomplished by movement of the trap by the trapped animal.

Two different embodiments of the invention are disclosed. In one, the spring arm is substantially the same length as the stake, and operates by lateral pressure on the soil in which the stake is driven to resist withdrawal of the stake primarily by friction. In the second embodiment, the spring arm is shorter, so that its upper end, when the stake is driven to full depth, is substantially below the surface of the ground. In this case, as the stake moves upwardly, the spring arm pivots laterally, ultimately reaching a stop which holds it in laterally extending position. Thus the arm constitutes imbedded anchoring means.

In either case, if the trapped animal succeeds in pulling up the stake, the stake and the arm extending at an acute angle to the stake from the end remote from the trap tether chain or line, tends to hang up on brush, vegetation, rocks, etc., so that the animal is prevented from escaping with the trap.

BRIEF DESCRIPTION OF THE DRAWINGS

FIG. 1 is an elevational view of the stake device showing the spring arm in limiting position.

FIG. 2 is a side view of the device shown in FIG. 1.

FIG. 3 is a perspective view of the stake.

FIG. 4 is a perspective view of the spring arm.

FIG. 5 is an elevational view of the second embodiment of the invention.

FIG. 6 is a fragmentary perspective view of details of the device shown in FIG. 5.

FIG. 7 is a fragmentary perspective view of details of the device shown in FIG. 5.

DETAILED DESCRIPTION

Referring first to FIGS. 1-4, there is shown a stake 10 formed of rigid plate or sheet metal capable of being driven into even relatively hard soil. For this purpose it is provided at its lower end with a pointed head indicated at 12, with the shank 14 above the pointed head, being of reduced width.

At its upper end the stake 10 is provided with an opening 16 which receives a ring 18 to which the tether chain or cable 20 is secured. Chain or cable 20 of course extends to the trap, and is intended to anchor the trap against being carried away by a trapped animal.

The structure so far described may be considered to be conventional, except that in the past it has required to be longer than when modified in accordance with the present invention.

In accordance with the first embodiment of the invention a spring arm 22 is connected to the head 12 of the stake. The arm 22 may be formed of relatively stiff rigid rod or wire material having at its lower end a short coil section 24 with relatively strong spring action urging the upper portion of the arm away from the stake toward the dotted line position seen at 22a in FIG. 1. The head 12 is provided with an enlarged opening 23 dimensioned to receive coil spring section 24 as best seen in FIGS. 1 and 2.

As seen in FIGS. 3 and 4, one end of the coil section 24 is bent to provide a short abutment arm 25 having its end bent to form projection 26 to be received in an opening 28 while the coil 24 is retained in opening 25. Retaining arm 22 is off-set as indicated at 29 between short arm section 30 and retainer arm 22, so that while the end turn of the coil 24 extends beyond one flat side of the stake, the main portion of the arm may lie against an edge of the stake, as well illustrated in FIG. 2.

It will be observed that retainer arm is fixedly supported in opening 23 by engagement at opposite sides of the head 12 by short arm sections 25 and 30, which are located at opposite ends of coil 24.

Intermediate its upper and lower ends, arm 22 is provided with an abruptly bent lateral extension 32 to enhance the holding action of the arm in the ground.

The upper end of the arm 22, when swung to vertical position against the action of the coil spring section 24, may be engaged by ring 18 as seen in FIG. 1. This permits driving the stake into the ground without interference from spring arm 22. After the stake is driven, ring 18 is lifted releasing spring arm 22 for lateral movement into ground gripping engagement with the soil into which the stake has been driven.

A useful result of using ring 18 which is connected to the tether line to latch arm 22 in vertical or inoperative position will be apparent. If the trapper should neglect to unlatch the spring arm, this will be accomplished by movement of the tether line 20 as a trapped animal moves the trap.

The position 22a of spring arm 22 seen in dotted lines in FIG. 1 is a limiting position determined by engagement between bent portion 29 of arm 22 with stop surface 36 on head 12. This provides a structure comprising a stake 10 and arm 22 which extend at an acute angle to each other, and will catch on brush, rocks, etc., if the trapped animal pulls the stake from the ground and drags it by its tether line 20.

Referring now to the embodiment of the invention illustrated in FIGS. 5-7, the stake 40 may be similar to stake 10, except that as shown a notch 42 is provided for receiving the bent end 44 provided at the end of short arm 46 at one end of the coil section 48 of spring arm 50. In this embodiment, spring arm 50 is pivotally supported adjacent the lower end of the stake 40 by mounting the coil section 48 in an opening identical with opening 23 in the first embodiment. The coil section has one turn exterior of the opening at one side of stake which terminates in the upwardly extending retaining arm portion. The retaining spring arm 50 is substantially shorter than stake 40, so that when the stake is fully driven as seen in FIG. 5, the upper end of the stake is substantially below ground level indicated at G.

The pointed head 54 is provided at one side with a laterally extending lug which bent to provide a stop 56 which is abutted by retainer arm 50 in the position illustrated in dotted lines at 50a, in which position it defines an acute angle with stake 40.

Attached to the upper end of spring arm 50 is a flexible cable 58 preferably a steel cable. The attachment illustrated is by a ball 60 crimped on the end of cable 58 after the cable is passed through an opening 62 formed in the flattened upper end 64 of arm 50. At the upper end of cable 56 there is provided a ring 65 for a utility which will later be described.

At its upper end, stake 40 is provided with inclined slot 66 in which is received a conventional chain lap-link 68 for connection to the trap tether line 70. Crimped to the cable 58 adjacent its upper end is a hook 72 positioned to engage in the link 68 when the arm 50 is vertical and adjacent an edge of stake 40, as shown in full lines in FIG. 5.

In use, with the device in the full line position of FIG. 5, and with hook 72 engaging link 68, the stake is driven to full depth, at which time the upper end of the spring retainer arm is retained in the full line position by cable 58 and hook 72. In this position, the operator pulls ring 65 upwardly, releasing hook 72, and arm 50 moves toward the dotted line position 50a to the extent permitted by the condition of the soil into which the stake is driven. However, any upward movement of the stake will cause the arm 50 to move further away from the stake 40 until it engages stop 56, at which time it will strongly oppose further withdrawal.

As in the case of the first embodiment, stake 40 and arm 50 will extend at an acute angle to each other if by chance the stake device is pulled free by a trapped animal and will tend to catch on brush or other obstructions to prevent the trap and stake assembly being dragged away.

When the trapper wishes to withdraw the stake, he will pull on ring 65 to bring the retainer arm substantially against the stake, at which time the stake may be drawn directly upwardly.

I claim:

1. A stake device for tethering an animal trap of the leg hold type comprising an elongated stake sharpened at its lower end to facilitate driving it into the ground, an effectively rigid spring retainer arm pivoted at its lower end to the lower end of said stake and spring means urging the retainer arm about its pivot connection to said stake in a direction away from said stake in which said retainer arm and spring means comprises a retainer arm portion having one end formed into a coil spring portion.

2. A stake device for tethering an animal trap of the leg hold type comprising an elongated stake sharpened at its lower end to facilitate driving it into the ground, an effectively rigid spring retainer arm pivoted at its lower end to the lower end of said stake and spring means urging the retainer arm about its pivot connection to said stake in a direction away from said stake in which said retainer arm and spring means comprises a retainer arm portion having one end formed into a coil spring portion, said coil spring portion comprising several turns, said stake having an opening in which an intermediate portion of said coil spring is received, a short arm extending from one end of the coil spring engaging one side of said stake, the rigid spring retainer arm portion extending from the other end of said coil spring portion and engaging the opposite side of said stake.

3. A device as defined in claim 2, in which the short arm at one end of the coil spring portion has a lateral projection engageable with a recess or opening in the lower end of said stake to fix the spring to provide a spring action tending to move the rigid retainer arm laterally of the stake to engage the soil into which the stake is driven.

4. A device as defined in claim 2, in which said stake is formed of flat stock, and said retainer arm portion is offset adjacent said coil spring portion to place the rigid retainer arm portion in the plane of the flat stake.

5. A device as defined in claim 1, in which the rigid arm extends substantially to the top of said stake, a ring pivoted to the upper end of said stake and movable over the upper end of said retainer arm, said ring serving also to connect to a tether line extending to a trap, whereby if the ring is not released by the trapper, tension on the tether line created by a trapped animal will move the ring to release the retainer arm.

6. A device as defined in claim 1, in which said retainer arm is provided intermediate its end with laterally extending ground engaging anchor means.

7. A device as defined in claim 1, in which said retainer arm is substantially shorter than said stake so that when said stake is driven the upper end of said arm is substantially below the ground level.

8. A device as defined in claim 7, which comprises a flexible cable connected to the upper end of said arm to extend above ground level even when said retainer arm is extended laterally, to provide means by which the trapper may pull the retainer arm toward vertical position to release the stake device for pulling up the stake.

9. A device as defined in claim 8, said stake having at its upper end a ring pivoted thereto for connection to a tether line leading to the trap, and a hook on said flexible cable engageable with said ring to hold said retainer arm substantially vertical as the stake is driven and being disengageable therefrom to release said retainer arm for ground engaging movement after the stake is driven.

10. A device as defined in claim 1, comprising stop means acting between the stake and the spring retainer arm to limit pivotal movement of the arm relative to the stake to define an acute angle therebetween, to provide an obstruction structure which will hang up on brush or the like if the stake is pulled up and a trapped animal tries to drag it away.

11. A stake device for tethering an animal trap of the leg hold type comprising an elongated stake formed of flat rigid stock, the upper portion of said stake having parallel edges, the lower end of said stake having an enlarged head extending beyond the edges of the upper portion of said stake, said head having a pointed bottom end and a spring receiving opening, an effectively rigid retainer arm having a coil spring portion received in said opening, and an abutment engaging said stake to bias the upper portion of said retainer arm outwardly away from said stake.

12. A device as defined in claim 11, in which said abutment is carried by an abutment arm extending from said spring coil, the lower portion of said retainer arm and said abutment arm engage opposite flat sides of said head to retain said coil spring in said opening.

13. A device as defined in claim 12, said retainer arm, abutment arm, and coil spring being formed of slightly resilient rod material in which the retainer arm is effectively rigid and the coil spring portion exerts a strong spring action.

14. A device as defined in claim 13, said head having a stop surface thereon limiting swinging movement of said retainer arm to a position in which it defines an acute angle with said stake.

15. A device as defined in claim 14, said retainer arm having an offset therein adjacent its lower end to position its upper portion in the plane of the flat stock of which said stake is formed.

* * * * *